(12) United States Patent
Beard et al.

(10) Patent No.: US 8,094,060 B2
(45) Date of Patent: Jan. 10, 2012

(54) METHOD OF DETECTING A TARGET (75) Inventors: Gavin Spencer Beard, Malvern (GB); Robert Michael Horey, Malvern (GB); Richard Oliver Lane, Malvern (GB); Samantha Jane Lycett, Malvern (GB)

(73) Assignee: Qinetiq Limited (GB)

( * ) Notice: Subject to any disclaimer, the term of this patent is extended or adjusted under 35 U.S.C. 154(b) by 328 days.

(21) Appl. No.: 10/543,583

(22) PCT Filed: Jan. 29, 2004

(86) PCT No.: PCT/GB2004/000302
§ 371 (c)(1), (2), (4) Date: Jul. 27, 2005

(87) PCT Pub. No.: WO2004/068163
PCT Pub. Date: Aug. 12, 2004

(65) Prior Publication Data
US 2006/0132354 A1    Jun. 22, 2006

(30) Foreign Application Priority Data
Jan. 30, 2003   (GB) .................................. 0302138.3

(51) Int. Cl.
*G01S 13/52* (2006.01)
(52) U.S. Cl. ............. 342/91; 342/93; 342/160; 342/189
(58) Field of Classification Search ...................... 342/91
See application file for complete search history.

(56) References Cited

U.S. PATENT DOCUMENTS

| | | | | |
|---|---|---|---|---|
| 4,857,934 A | * | 8/1989 | Voles | 342/90 |
| 5,150,426 A | * | 9/1992 | Banh et al. | 382/103 |
| 5,396,252 A | | 3/1995 | Kelly | |
| 5,400,087 A | | 3/1995 | Uramoto et al. | |
| 5,499,195 A | * | 3/1996 | Castelaz | 342/159 |

(Continued)

FOREIGN PATENT DOCUMENTS

GB     2 054 309     2/1981

(Continued)

OTHER PUBLICATIONS

Prengaman et al. "A retrospective detection algorithm for extraction of weak targets in clutter and interference environments", London, UK, IEE pp. 341-345 (1982).

*Primary Examiner* — Thomas Tarcza
*Assistant Examiner* — Matthew M Barker
(74) *Attorney, Agent, or Firm* — McDonnell Boehnen Hulbert & Berghoff LLP (57) ABSTRACT

A method for processing returns from a sensor, such as a radar system, in order to identify targets is provided. The method uses a track before detect routine to integrate data from several scans in order to give better discrimination. In running the track before detect routine however a number of possible target motions are postulated and the data combined accounting for such motions. A result above a threshold may then be indicative to a target present and moving with the postulated velocity. The method gives more accurate target detection as the combined data at the correct target motion postulate is more consistent than transient noise and clutter. Once a target has been identified it is preferably removed from the data set in searching for additional targets.

17 Claims, 4 Drawing Sheets

| U.S. PATENT DOCUMENTS | | | | | FOREIGN PATENT DOCUMENTS | | |
|---|---|---|---|---|---|---|---|
| 5,644,508 | A | | 7/1997 | McNary et al. | GB | 2 114 394 | 8/1983 |
| 5,842,156 | A | * | 11/1998 | Hong et al. ............... 702/179 | GB | 1 605 307 | 11/1988 |
| 6,282,301 | B1 | * | 8/2001 | Haskett .................... 382/103 | JP | 2001-208835 | 8/2001 |
| 6,538,599 | B1 | * | 3/2003 | David ....................... 342/196 | * cited by examiner | | |

METHOD OF DETECTING A TARGET

FIELD OF THE INVENTION

This invention relates to a method of detecting a target, especially to a method for detecting a target in a radar signal.

BACKGROUND OF THE INVENITON

Radar systems are well known in a variety of applications. Expensive, complex radars are known which have sophisticated mechanisms for detecting a target. However a large number of applications do not justify the expense of a complex and high cost radar system. For instance, low cost radars are often used in maritime applications, such as on small boats etc. In such applications with relatively simple radar systems the detection of small targets in sea and land clutter is often quite difficult. Fast moving targets can also be difficult to detect accurately.

There are known ways to improve target detection by processing of radar data however the amount of processing that can be done on the signals from a low cost radar system is somewhat limited.

An Extended Kalman Filter uses a linear approximation of system dynamics and updates an estimate of target position using information from previous data and a new measurement. However although the Extended Kalman Filter works on non-linear systems it assumes Gaussian noise. Noise is not always Gaussian, depending on the receiver type. Often clutter is the limiting problem, not noise—and clutter is often non-Gaussian.

A Particle Filter represents the probability of a target being in a particular position by a cloud of weighted particles. Each of these particles changes position in one time step in a way determined by an estimate of target dynamics. Over time several particles' weights tend to zero. In a re-sampling step particles with the lowest weight are removed and new ones are created near to the heaviest weighted particles. The Particle Filter solves the problem of non-Gaussian noise, but it can be slow to run on large data sets. A real time system is required.

The Viterbi algorithm creates a scoring function based on the log-likelihood ratio for a set of hypothetical paths and chooses the most likely path. Coherent Track Before Detect schemes use Doppler information to estimate target velocity. This can then be used in other algorithms to aid tracking. A Coherent Track Before Detect scheme may run in real time but requires a coherent radar, which can be expensive relative to a non-coherent one.

A 3D Matched Filter takes the 3-dimensional Fourier Transform of the time-2D image space and uses this to estimate the motion energy for a set of velocity vectors. The vector with the maximum energy is chosen as the target track.

Adaptive Constant False Alarm Rate (CFAR) threshold setting works by passing a statistics window over the scene and estimating parameters of a distribution. A clutter rejection threshold is then set based on that distribution and a probability of false alarm (PFA). However statistics used in CFAR threshold setting are often assumed to be Rayleigh or Gaussian when this is not necessarily the case.

GB patent application 1, 605, 307 describes a target detection system for radar which stores signals received over time from the same direction. The stored signals are then integrated in various combinations selected to include elements indicative of a target moving in a particular way. If a target is present and moving in the same way as one of the selected combinations the integrated signal exceeds a threshold. Thus improved target detection can be achieved. However the method would struggle to identify two targets moving with different velocities.

SUMMARY OF THE INVENTION

It is therefore an object of the present invention to provide an improved method of target detection.

Thus, according to the present invention, there is provided a method of detecting a target in data from a scene comprising the steps of;

i) taking a main data set comprising a series of scans of the scene, each scan comprising a plurality of data points corresponding to different parts of the scene, ii) taking a first scan and calculating, for each data point in the first scan, an integrated data value at each of a predetermined number of postulated target velocities, each integrated data value being calculated using that data point in the first scan and data points in other scans that would correspond to a target moving at the postulated target velocity, iii) identifying the greatest integrated data value and recalculating the remaining integrated data values excluding any data points which contributed to the greatest integrated data value, iv) identifying for each data point in the first scan whether any of the integrated data values is above a threshold, and v) using an integrated data value above the predetermined threshold as indication of a target.

The main data set is taken from the output from a sensor and consists of a sequence of scans of a scene. A scan could be a frame captured from a staring array or could be the data captured from a scanning sensor. For instance the sensor may be a radar antenna. The data points correspond to the measured signal from certain points of a scene. Where the sensor is a detector array, a data point could be the output from a particular element in the array. For radar the data points will be the return signal for the different range cells.

The essence of the present invention lies in the fact that when a target is present in a scene it will give rise to signals in successive scans. Whilst random noise and spurious effects will be present they will tend to be transient in nature whereas the return from the target will be more consistent. Thus taking the signal received over several scans and integrating the signal will aid in discriminating transient effects from the constant effect of the target.

Were the target to be motionless the integration would simply involve integrating the returns from the same position in the scene. However the target may be moving in the scene and so target returns may occur in different parts of the scene at different times. The position of the target in the scene depends upon its velocity. Were the target velocity known the position of the target in successive scans could be predicted.

The present invention works by postulating that a target may be present and travelling with a particular velocity. Those data points where a return would be expected, were a target present and moving at that postulated velocity, are then integrated. This is done for each data point in the scan under consideration and for a number of postulated velocities.

The result is, for each data point in the scan under consideration (the first scan), a series of integrated data values corresponding to particular postulated velocities. Imagine that a target was present and had contributed to a data point under consideration in the first scan. Had the target velocity been postulated correctly then each corresponding data point in the other scans considered would also comprise a return from the target. Therefore the integrated data value at this velocity postulate would basically be a summation of lots of data points corresponding to the target. Were the postulated velocity incorrect however then the data points in the other scans considered would have been taken from the wrong part of the array and therefore would not include any returns from that target. Although these data points may have contributions from random noise or returns from clutter in the scene these will not be as consistent as the target returns. Therefore the integrated value calculated at the correct velocity would be greater than that at any other postulated velocity.

It will be appreciated however that whilst a data point in the first scan may not correspond to a target itself the integrated data value for that point at an incorrect velocity postulate may actually include a return from the target. Therefore the integrated data value for that point may be relatively high—not as high as the integrated data value for the right point in the first scan at the right velocity postulate but this false recording effect could cause false positives or even make the presence of a real target harder to detect.

The method of the present invention therefore identifies the greatest integrated data value and then recalculates the other integrated data values while removing the data points that contributed to the greatest value. In other words the greatest integrated value is taken to be that most likely to be a target. If this is the case then the data points in each scan which contributed to that value are all likely to correspond to that possible target. Therefore they can be removed from the calculation of other integrated data values so as to reduce the effects of that possible target thereon.

The present method therefore effectively identifies the data points most likely to be a target in the first pass and then recalculates, having eliminated those points from consideration. This aids the final determination of whether the greatest data point is a target or not—for instance if a constant false alarm rate processing step is used the presence of false readings in nearby data points would reduce confidence.

Furthermore the removal of the effects of the first possible target identified improves the identification of other targets. This is especially so if the first target gives a large signal whereas the signal from the second target is faint. The effect of a false postulate happening to include a return from the first target may hide the presence of the second target. By removing the effects of the first possible target however the next greatest value would be the fainter second target at the correct velocity postulate.

The recalculation of integrated data values obviously does not necessarily need to involve alteration of any integrated values which do not include a contribution to the greatest value.

Preferably the step of identifying the greatest integrated value and recalculating the integrated data values for the remaining data points is performed iteratively. The iteration could be performed a certain predetermined number of times, for instance to allow for the maximum number of targets expected. Alternatively the method could be iterated until there are no integrated values above a threshold which may be the threshold used to identify targets, i.e. the method is operated until all targets have been identified.

Note that the term 'greater' and the term 'above a certain threshold' are meant to imply that the integrated data value is more indicative of a target and is beyond a threshold which distinguishes a target signal from non-target signal. For some sensors the presence of a target might actually reduce the output from the sensor. For instance imagine the sensor has a high output when looking at the background scene and a low output when a target is present (such as may be the case for some detector arrays at certain wavelengths looking for a contrast against the ambient background). In this case the integrated data value where all the data points corresponded to a target would be lower than one calculated where at least some of the data points were not from target returns. Therefore the term above a certain threshold is meant to mean that a certain threshold is set which would distinguish a target like signal from a non target like signal and the particular integrated value is on the side of the threshold that indicates it is target like. The term greater should be read in the same way.

The invention therefore offers a simple and fast processing scheme requiring minimal data manipulation and which can significantly aid in target detection, even for small and fast moving targets. The scheme can cope with more than one target in a scene and the output of the method could either be provided to a display or a tracking system or both.

Preferably the first scan, which is used as the base for identifying corresponding data points in other scans according to the postulated velocity, is the latest scan acquired. As the method will identify which data points in the first scan correspond to a target it is preferred that it is the most recently acquired scan where the identification is made. The main data set then preferably comprises a predetermined number of previous scans. The method may be operated in real time with a certain number of scans being held in a store. When a new scan is obtained the method is run thereon using the stored data and the location of any targets (in the new scan) identified. After the new scan has been processed it can be placed in the store to be used for processing of the next scan to be acquired.

The greater the number of scans used in producing the integrated data value the more accurate the method may be (assuming linear target motion) but the greater the computational load. Conveniently the number of scans used is between three and twenty or between three and fourteen. However radar systems with relatively fast scan times may use more than twenty scans.

Note that the velocity postulate may actually postulate the velocity changing, i.e. the method could postulate accelerations of the target. Wherever velocity is mentioned in this method, acceleration may be used in addition to velocity. Obviously though as the number of postulated motions increases so does the computational load. Also the number of scans used in the method and the time between acquisition of each scan will define a certain window of time during which a target may have moved. Where this window is relatively small the likelihood of the target velocity changing significantly is also low.

Conveniently the integrated data value is averaged before comparing to the threshold level. An average value allows varying numbers of data points to be used while integrating along a velocity postulate without needing to alter the level of the threshold being used.

Once the data has been processed the threshold is applied to discriminate between targets and clutter in the scene. The threshold settings have to take into account a number of factors which affect the signal received by the detector used. Some of these factors, such as probability of false alarm may be determined in advance. Each data point in the first scan may be associated with a different threshold level, i.e. the different parts of the scene have their own associated threshold. Conveniently the threshold levels are calculated from an array of clutter signals from a scene, for instance the main data set, assuming a particular statistical model for the clutter signals. Conveniently a gamma distribution statistical model is used.

Conveniently the method includes the initial step of normalising the data points in the main data set.

The method may also, for each target identified, provide an indication of the postulated velocity associated with that target. As has been explained a number of different postulated velocities are tried for each data point in the first scan. If any of these is above the threshold the greatest is selected. Therefore the method inherently not only identifies the location of the target but also an indication of its velocity. This information may be provided to a tracking system to aid tracking of a target.

The main data set may advantageously comprise data from a radar system. Each data point may comprise the return signal gated for a particular range cell as would be understood by one skilled in the art. A scan could comprise a series of readings from different directions, such as azimuthal directions, with a plurality of range cells from each direction. The method works on simple radar systems giving real time target location, and velocity information with relatively limited processing.

Where the data comes from a radar system the method preferably applies a Within Beam Integration (WBI) step to the data. WBI, as would be understood to one skilled in the art, combines the returns from successive readings at slightly different azimuths, with appropriate weightings, where the beamwidth is such that the readings overlap.

The invention may be implemented in a computer program and another aspect of the invention comprises a computer programmed to carry out the method as described.

In another aspect of the invention there is provided a sensor with target detection comprising a detection means for receiving signals from different parts of the scene, a store means for storing data from successive scans of the scene and a processor means adapted to perform the method described above.

Thus the sensor captures successive scans of a scene and stores the data. The stored data can then be used in the processing of newly acquired scans. The sensor may comprise a radar antenna and the sensor may have a display for displaying the location of any detected targets. Additionally or alternatively the location and velocity of the target may be output to a tracking means.

DECRIPTION OF THE DRAWING

The invention will now be described by way of example only with reference to the following drawings of which.

DESCRIPTION OF THE INVENTION

A simple radar system emits a pulse of RF radiation and an antenna detects any returned signal. The received signal is generally gated to measure the return signal at a plurality of different times corresponding to measurements at different ranges, i.e range cells. The antenna itself is also scanned, for instance the antenna may be rotating, to measure returns from different directions. One complete scan will thus generate a plurality of data signals corresponding to different azimuthal directions or cells and the signals for each azimuthal direction will comprise a plurality of data signals corresponding to a plurality of range cells. Thus the return from any one scan will be a two dimensional array of data in range and azimuth.

The presence of a target in the scene will create a return signal in the particular range and azimuth cell in which the target is located. However clutter in the scene and general noise will obscure the target return signal. For instance in marine environments sea clutter will degrade reliable target detection.

Figure 1:
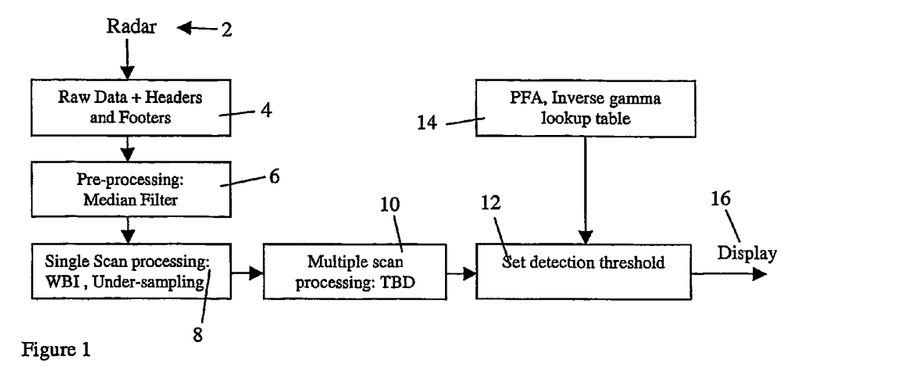
FIG. 1 shows the steps in the method of the present invention applied to a radar system.

The present invention provides a method of improving target detection using several scans of data. FIG. 1 shows a flow chart illustrating the principle of the method.

The data from the radar system, generally indicated 2, is stored in a special block structure 4 that includes extra information in the headers and footers such as azimuths, North markers and GPS information.

The data is first pre-processed 6 with a median filter to normalise the signals received.

The normalised data is then processed in a Within Beam Integration (WBI) step 8. WBI is a known technique for improving signal return. It will be understood by one skilled in the art that the radar system will have a certain beamwidth. Typically the signal received by the radar system at one azimuth will overlap with the signal received at the next azimuth measured. The signals received at the same range for successive azimuths can then be integrated within the beam with appropriate weightings to give an integrated signal which has a better signal to noise ratio.

The WBI processed data is then under sampled to reduce the number of pulses to a manageable amount. As the WBI integrated pulses are generally separated in azimuth by much less than a beamwidth they can be sampled taking, for example, every fifth pulse. Typically some overlap is allowed, perhaps ¼ of a beamwidth to allow for targets falling halfway between two pulses.

A Track Before Detect (TBD) routine 10 is then applied to the data. The TBD routine integrates the signals from the same azimuth and range cell in successive scans. As the return from the target is more consistent than the signal from clutter the TBD routine improves target detection.

However if the target is moving the target may change either range or azimuth or both between successive scans. Therefore the TBD routine postulates several possible target velocities and combines the data accordingly as will be described later.

After the TBD routine the data is thresholded 12. When the TBD routine is applied to random noise with a variety of distributions including Gaussian, Rayleigh and Gamma the output is a skewed distribution which is approximated by a generalised gamma distribution. To estimate parameters of the distribution a statistical window is moved over the whole image and for that window the mean, standard deviation and Fisher skewness are measured. For a given probability of false alarm (PFA) a threshold can be set for each range and azimuth cell. This may be done through an iterative scheme to approximate the inverse gamma function that calculates threshold for a given skewness and PFA. General values of threshold for all useful skewnesses and PFAs are stored in a look-up table 14 for real time use. The mean and standard deviation are then used to convert this general threshold to one for the specific case in hand. If targets have been detected correctly they will show up above the threshold and background clutter will be rejected.

The position of the detected targets can then be passed to a display 16.

Figure 2:
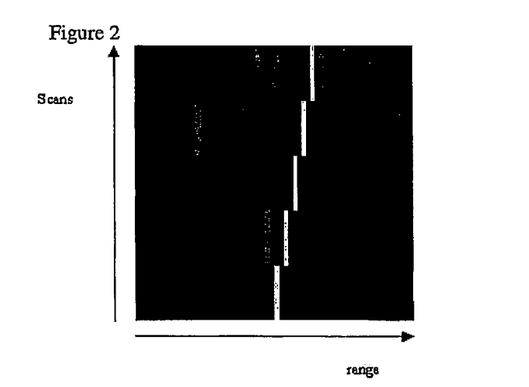
FIG. 2 shows a radar data array with the returns at different range cells in a particular direction from a plurality of scans.

The track before detect routine 10 combines data from successive scans in an appropriate manner to effectively remove the effect of any target motion. The first stage is to form a data set corresponding to the appropriate motion. FIG. 2 shows an array, or main data set, formed from the range data obtained in successive scans at a particular azimuth.

The first stage of the TBD routine is to postulate a particular velocity for the unknown target and shift the data set to account for the postulated velocity. The velocity postulates may be chosen at the time and may be based on other information, such as the velocity calculated in a previous iteration or the particular type of target required. Or the velocity postulate information may be predetermined and stored in a look up table.

Figure 3:
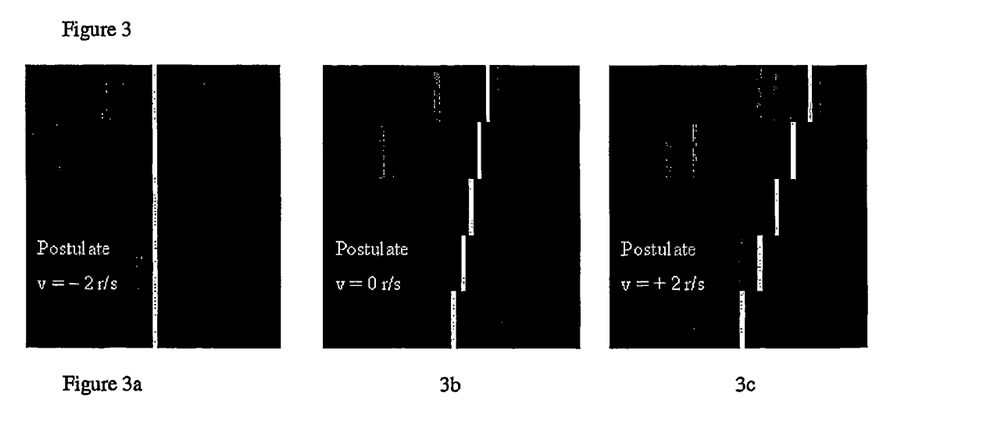
FIG. 3 shows the radar data array of FIG. 2 shifted to apply certain velocity postulates.

If a target is moving in range only shifting the data effectively involves shifting successive data scans in range. FIG. 3 shows some profiles after range shifts have been applied. FIG. 3*a* shows a postulated radial velocity of −2 range cells per second (r/s), FIG. 3*b* shows no postulated velocity (and therefore is the unperturbed data set) and FIG. 3*c* shows the profile for a postulated velocity of +2 r/s.

By shifting the data sets according to the postulated velocity those data points in other scans that correspond (at that velocity) to a data point in the base scan (the current scan) are identified and aligned.

The above assumes only a radial velocity component to the target. In some circumstances the actual distance to the target is such that the target does not move appreciably in azimuth and movement in range is the only motion needing consideration. In which case it will be appreciated that velocity postulates can by applied by shifting the data corresponding to successive scans along the range axis. However azimuthal motion could be considered too, in which case the postulated profile would be a composite data set comprising signals from other azimuths.

Figure 4:
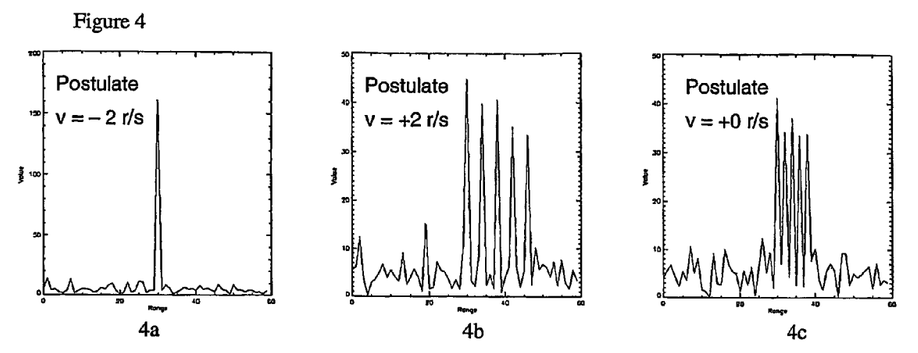
FIG. 4 shows the averaged range profiles for the shift matrices shown in FIG. 3.

Each of the postulates is then averaged over a number of scans. If the postulated velocity is equal to the true target velocity then all the energy from the target will appear in the range cell corresponding to the latest target position. If the postulated velocity is not equal to the true target velocity then the energy will be smeared out over several range cells. FIG. 4 shows the energy plots for the three postulated velocities as a function of range. It can be seen that FIG. 4*a* has a single peak with all the energy concentrated in one range cell whereas FIGS. 4*b* and 4*c* show the energy in a series of range cells.

Typically 3 to 14 or maybe 20 scans are averaged, depending on the scan rate although the amount could vary depending on the system. Use of more scans increases the processing load and increases the likelihood that the target dynamics, i.e. the velocity, might have changed. Fast scanning radar systems may be used with a greater number of scans being considered.

Figure 5:
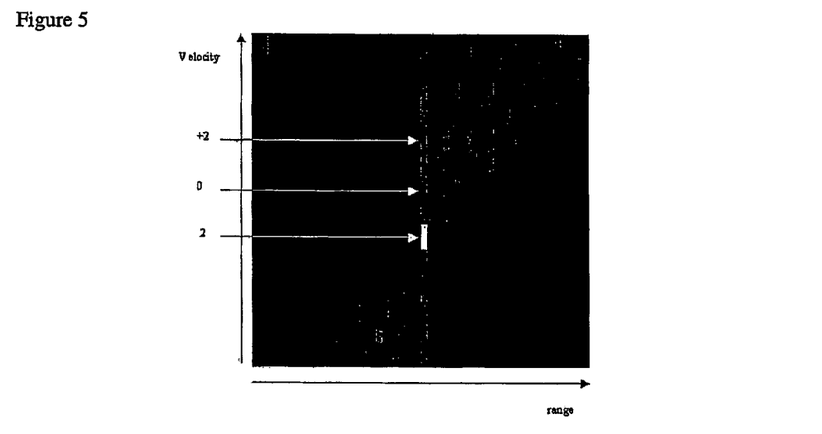
FIG. 5 shows the averaged range profiles for several velocity postulates.
Figure 6:
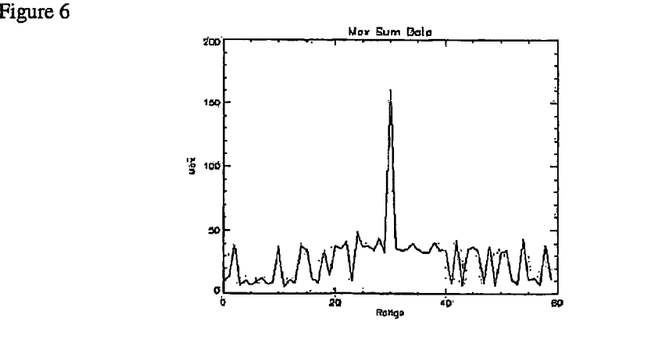
FIG. 6 shows the range profile for the brightest target in the range-velocity area of FIG. 5.

The averaged range profile from all the velocity postulates may be plotted as a range-velocity area (shift matrix) as shown in FIG. 5. Then, for each range cell, the maximum value and the velocity postulate that caused that maximum is determined. However as can be seen from FIG. 6, which shows the range profile for the brightest target, the effects of shifting the brightest target are still seen in other nearby range cells—so called ghosting. As explained above the effect of averaging the range profiles over a number of scans and velocity postulates allows identification of the correct target and velocity as, at the correct velocity, the energy from the target is concentrated in one range cell rather than spread amongst many range cells. This spreading effect arising from incorrect postulates of target velocity gives rise to a greater unwanted background in the other range cells.

Therefore, to counteract this effect, once the brightest target has been identified it is removed from the shift matrix, i.e. the data points corresponding to the brightest target are removed in calculating the shift matrix. The newly created shift matrix therefore will only have returns from any other targets. This is done for successive targets, until no more remain, allowing the true maxima to be obtained.

Alternatively the likely maximum number of targets in the scan, or within certain range cells in the scan, could be searched for and the process stopped when either the number of targets is reached or the next brightest target falls below the threshold.

Figure 7:
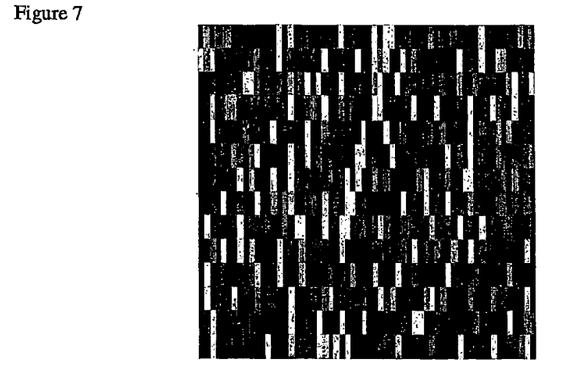
FIG. 7 shows the averaged range profiles for several velocity postulates with the points corresponding to the brightest target removed.
Figure 8:
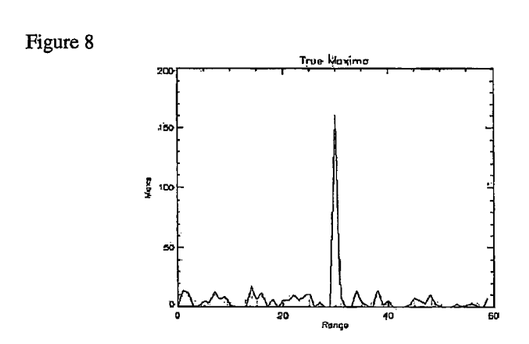
FIG. 8 shows the range profile for the brightest target when the effects of the brightest target are removed from the shift matrix.

The range profiles with the brightest targets removed are shown in FIG. 7. Removing the brightest targets reduces the effects on surrounding range cells. FIG. 8 shows the range profile where the range for the other cells is taken from the matrix with the brightest target removed. It can be seen that the shoulders around the peak have diminished. Therefore when the threshold is applied only the peaks corresponding to actual targets will be above the threshold and will be identified as targets.

Figure 9:
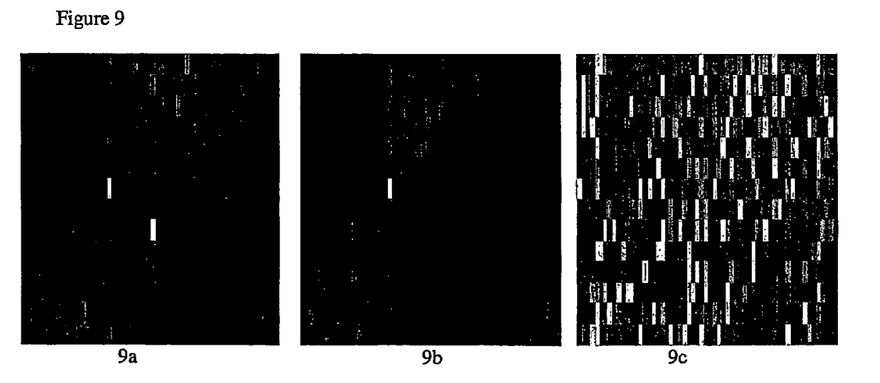
FIG. 9 shows the radar data array shift matrices for a scene with two targets.
Figure 10:
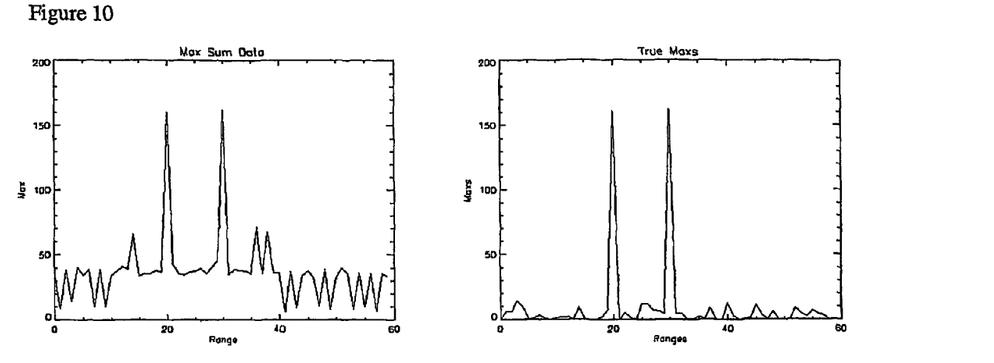
FIG. 10 shows the averages range profiles before and after target removal.

FIG. 9 shows the shift matrix formed for two targets at the same azimuth with different start ranges and velocities. FIG. 9*a* shows the shift matrix formed using all the data. FIG. 9*b* shows the result after removing the first target from the shift matrix and FIG. 9*c* shows the remaining shift matrix with both targets removed. The advantage of successively removing the targets from the shift matrix whilst finding targets is indicated in the final range profiles shown in FIG. 10. FIG. 10*a* shows the range profile before target removal and FIG. 10*b* the situation after removal. The technique can be used for any number of targets up to the maximum expected for any particular situation and the algorithm does not confuse targets crossing each other in range.

The method according to the present invention therefore provides a detection scheme that can operate with simple radar systems to improve target detection. The method can cope with non-Gaussian noise and the thresholds are therefore more accurate. The scheme can run in real time for large data sets and can cope with noncoherent radars. The method also inherently gives an indication of target velocity.

The scheme has particular application for maritime surveillance. Small craft such as speedboats that operate in littoral waters are currently hard to detect due to sea and land clutter. This present invention improves detection and could be used for coastal patrol. However as the skilled person will be aware the method could be used with other radar systems, for instance phased array radars, or could even be used with sensor types other than radar.

Lidar systems (light detection and ranging apparatus), for instance, could easily use this method. Indeed the data set could be the output of an imaging array or acoustic array, in one or two dimensions and scanned or not scanned. In an imaging array, say, a frame time would represent a scan and the output of each element in the array would constitute a data point. The basic method would be the same though—assume that a data point in a base scan represents a target and then postulate possible target velocities and combine the data from other scans appropriately before applying a threshold.

Figure 11:
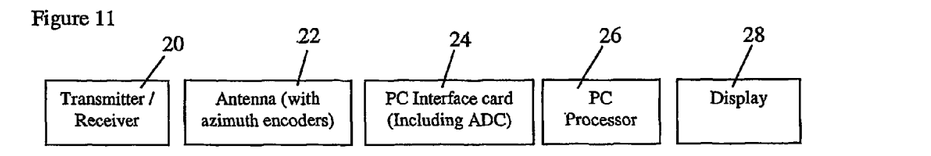
FIG. 11 shows a schematic of apparatus for implementing the present invention on a radar system.

The method could be implemented fairly simply using the radar apparatus shown in FIG. 11. The radar, generally indicated 2, comprises a transmitter/receiver 20 connected to a scanning antenna 22 with azimuth encoders. The output of the radar system is connected to a radar interface card 24 for a personal computer (PC) 26 which includes an analogue-to-digital converter (ADC). The radar data is stored in a special block structure and processed by the PC according to the current method. The output from the processor may be output to any conventional radar display 28.

As mentioned above the effect of postulated motion in range can be determined by simply shifting data acquired in successive scans relative to the range axis. This is very easy to achieve computationally, especially with digital processing. The effect of motion in two dimensions can also be easily postulated however. Where the data corresponds to an x-y view of a scene the motion can be postulated by shifting the data in both x and y directions and postulating different velocities. For a radar system taking data from different range and azimuth cells motion in range and/or azimuth can be considered. Where the data is stored in a two dimensional x-y type data array it will be appreciated that a linear motion in the scene would not necessarily translate to a linear progression of the target through the data cells due to the different co-ordinate systems. The data shifts applied to successive scans to estimate possible motion may take account of this fact when estimating motion. Alternatively the acquired data may undergo a co-ordinate transformation from a radial co-ordinate system to the x-y data store to allow linear sifts of the data to estimate possible motions.

The invention claimed is:

1. A method of detecting a target in data from a scene comprising using a computer or processor to perform the steps of;
   i) taking a main data set comprising sensor output from a series of scans of the scene, each scan comprising a plurality of data points corresponding to different parts of the scene,
   ii) taking a first scan and calculating, for each data point in the first scan, an integrated data value at a predetatinined number of postulated target velocities, by integrating that data point in the first scan with data points from other scans which are shifted according to said postulated velocity,
   iii) identifying the greatest integrated data value and recalculating the remaining integrated data values excluding data points from the first scan and the shifted data points from other scans which contributed to the greatest integrated data value,
   iv) identifying for each data point in the first scan whether any of the integrated data values is above a threshold, and
   v) using an integrated data value above the threshold as indication of a target.

2. A method according to claim 1 wherein the first scan is the latest scan acquired.

3. A method according to claim 1 or wherein the main data set comprises data from between three and twenty scans.

4. A method according to claim 1 wherein the integrated data value is calculated by averaging the data points used to form the integrated data value.

5. A method as claimed in claim 1 wherein the step of identifying the greatest integrated data value, and recalculating the integrated data values is performed iteratively until no integrated value is above the threshold.

6. A method as claimed in claim 1 wherein the threshold level is calculated individually for each data point in the first scan.

7. A method as claimed in claim 6 wherein the threshold is based on an inverse gamma distribution applied to the main data set.

8. A method as claimed in claim 1 wherein the method further comprises the initial step of normalizing the data points in the main data set.

9. A method as claimed in claim 1 wherein the method provides, for each target identified, an indication of the postulated velocity associated with that target.

10. A method as claimed in claim 1 wherein the main data set comprises data from a radar system.

11. A method as claimed in claim 10 wherein, prior to step (i) a within beam integration step is performed.

12. A computer readable medium including a program for performing the method according to claim 1.

13. A computer programmed to perform the method according to claim 1.

14. A sensor with target detection comprising a detector arranged to receive signals from different parts of a scene, a data store arranged to store data from successive scans of the scene and a processor adapted to perform the method according to claim 1.

15. A sensor according to claim 14 further comprising a radar antenna.

16. A sensor according to claim 14 wherein the sensor also comprises a display for displaying any identified targets.

17. A sensor according to claim 14 wherein the sensor also comprises a tracker and the processor outputs an indication of the location and velocity of any targets to the tracker.

* * * * *